United States Patent [19]

Moreiras

[11] 4,063,760
[45] Dec. 20, 1977

[54] QUICK CONNECT COUPLING
[75] Inventor: Luis Moreiras, Twinsburg, Ohio
[73] Assignee: The Weatherhead Company, Cleveland, Ohio
[21] Appl. No.: 735,949
[22] Filed: Oct. 27, 1976
[51] Int. Cl.² .................................... F16L 33/18
[52] U.S. Cl. ............................ 285/242; 285/93; 285/249; 285/321; 285/DIG. 22
[58] Field of Search ............. 285/249, 248, 321, 305, 285/242, DIG. 22

[56] References Cited
U.S. PATENT DOCUMENTS

| | | | |
|---|---|---|---|
| 2,152,975 | 4/1939 | Sanford | 285/249 |
| 2,440,452 | 4/1948 | Smith | 285/321 X |
| 2,935,343 | 5/1960 | Ellis | 285/95 |
| 3,193,310 | 7/1965 | Hildner | 285/248 X |
| 3,314,696 | 4/1967 | Ferguson et al. | 285/DIG. 22 X |
| 3,540,760 | 11/1970 | Miller | 285/321 |
| 3,698,742 | 10/1972 | Jones et al. | 285/321 X |

FOREIGN PATENT DOCUMENTS 1,525,582   5/1969   Germany .................. 285/242

Primary Examiner—Thomas F. Callaghan
Attorney, Agent, or Firm—McNenny, Pearne, Gordon, Gail, Dickinson & Schiller

[57] ABSTRACT

A quick connect coupling is disclosed providing a body assembly having a tube end receiving passage proportioned to closely fit the forward end of a tube. A seal is located in the body assembly to provide a fluid tight joint between the end of the tube and the body assembly. The body assembly also includes a lock ring retaining groove within a nut with an expandable lock ring positioned therein. Mounted on the tube at a location spaced from the end thereof is a locking sleeve which is crimped inwardly toward a tubular insert to lock the locking sleeve in position. The forward end of the locking sleeve is formed with a camming ramp which extends toward a lock ring groove. Assembly of the coupling requires the mere axial movement of the tube end assembly into the body assembly until the seal engages the outer surface of the tube and the lock ring bridges between the nut groove and the lock sleeve groove to permanently connect the tube end and the nut.

8 Claims, 6 Drawing Figures

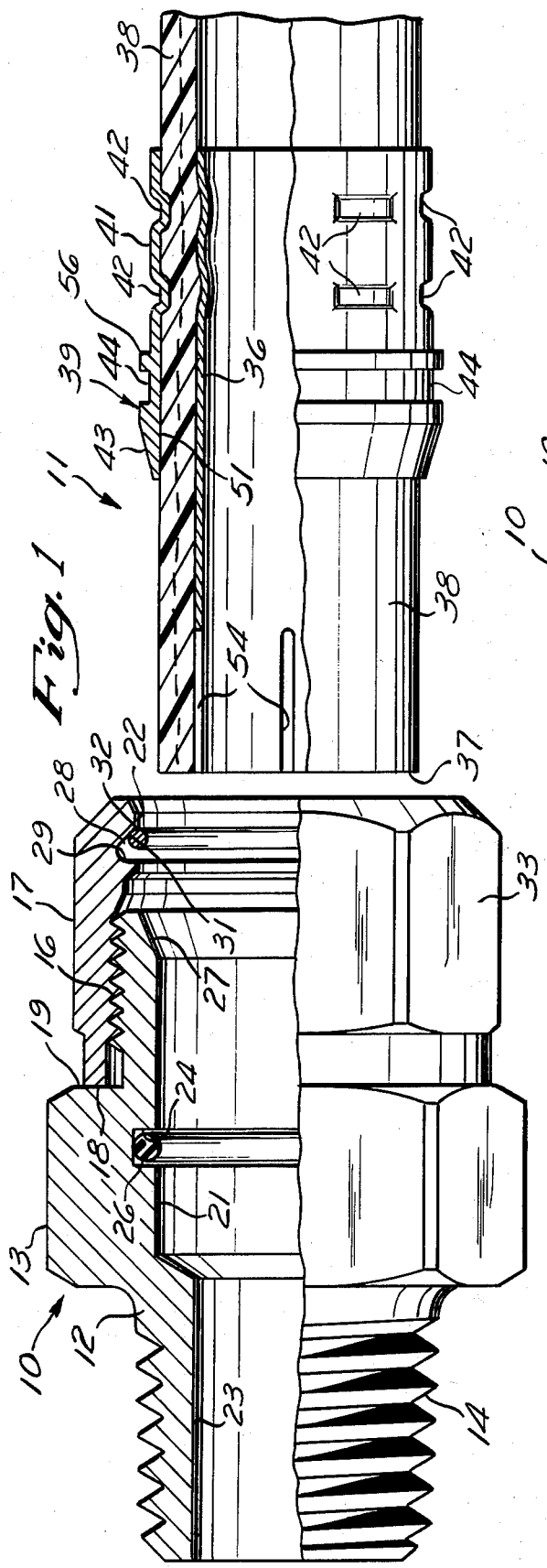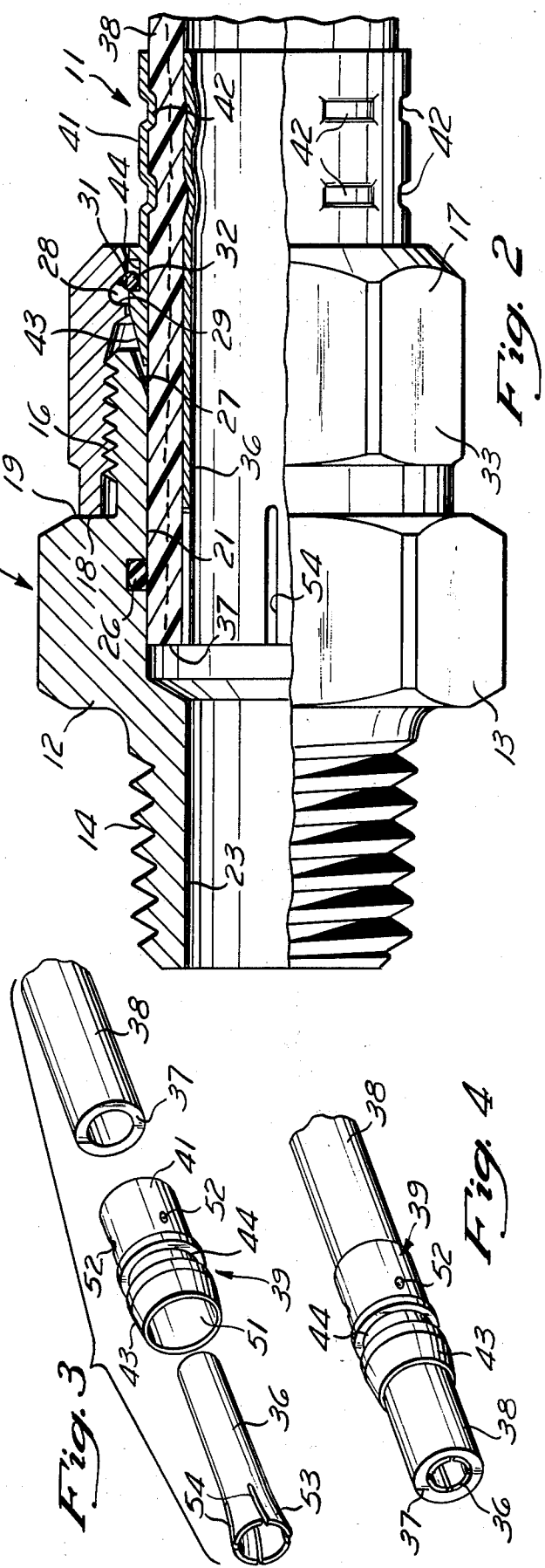

QUICK CONNECT COUPLING

BACKGROUND OF THE INVENTION

This invention relates generally to tube couplings and more particularly to a novel and improved quick connect tube coupling.

PRIOR ART

Quick connect couplings are known. In such couplings a body assembly may be pre-assembled on associated equipment, and the tube end is subsequently installed by merely pressing the tube end into the body assembly. Such quick connect couplings are particularly desirable when the tube must be connected in a location which is not readily accessible since it eliminates the need of starting the threads and the danger of cross threading. Further, since the body assembly may be threaded into place as a pre-assembly operation, it is easy to insure that the proper torquing of the body assembly is achieved. Further, the time of assembly and in turn the assembly cost is reduced.

Quick connect couplings provide means to seal between the tube end and the body assembly and to provide a mechanical locking of the tube in the body assembly. In some quick connect couplings a tube end collar is provided which is mounted on the end of the tubing and the sealing and mechanical locking functions are provided between the collar and the body assembly. Examples of such couplings are illustrated in the U.S. Pat. Nos. 2,898,130 issued Aug. 4, 1959; 2,935,343 issued May 3, 1960; 3,314,696 issued Apr. 18, 1967 and 3,540,760 issued Nov. 17, 1970. Such couplings require that the collar be mounted on the tubing with a joint which is both fluid tight and capable of supporting the mechanical load encountered. Also, such collar must include structure for sealing with a body assembly.

In other instances a seal system is provided in which the seal is provided directly between the tube and the housing assembly. Examples of such couplings are illustrated in the U.S. Pat. Nos. 2,831,711 issued Apr. 22, 1958; and 3,312,484 issued Apr. 4, 1967. Such Letters Patents disclose a toggle or a locking ring shaped to be cammed into the exterior surface of the tube. Such locking rings produce stress concentration on the tubing and when the tubing is formed of soft material such as plastic or elastomeric material such locking rings tend to cut into the tubing surface and weaken the tube.

SUMMARY OF THE INVENTION

There are a number of aspects of the present invention. In accordance with one of the broader aspects of this invention a quick connect coupling is provided in which the seal is provided directly between the tubing and the housing assembly in combination with a simple, novel and improved mechanical locking system which prevents high localized stresses on the tubing or cutting into the tubing.

In the illustrated embodiments a metallic connector sleeve is crimped onto plastic tubing at a location spaced back from the end of the tubing. Such sleeve is formed with a forward camming ramp which expands a locking ring and a groove into which the locking ring snaps when the coupling is assembled. With such structure the mechanical locking is provided by strong substantially rigid parts but the locking forces are distributed along the tube surface and damaging stress concentrations do not occur. In the illustrated embodiments the body assembly includes an O-ring type seal which directly seals with the outer surface of the tubing so that it is not necessary to provide a fluid tight connection between the tubing and the connector sleeve.

In accordance with another aspect of this invention a novel and improved structure is provided in which the connector sleeve is sized, before crimping, to fit over the tube with slight clearance. However, the sleeve is also provided with inwardly extending protrusions which engage the tube surface to locate the sleeve along the tube. In the illustrated embodiments such protrusions are provided by dimples deformed into the sleeve and arranged to frictionally engage the tube surface. Such protrusions function to retain the sleeve in the desired position prior to the crimping operation.

In accordance with another aspect of this invention, a tubular insert is easily located within the sleeve so that the tubing is supported internally within the crimping zone. The proper location of the insert is provided by pushing the insert into the tube until the end thereof is at the tube end. Here, again the insert is sized to easily fit into the tubing and means are provided on the insert to prevent it from slipping beyond the proper installed location.

These and further aspects of the invention are more fully described in the following detailed description and drawings.

BRIEF DESCRIPTION OF THE DRAWINGS

FIG. 1 is a side elevation partially in longitudinal sections illustrating a first embodiment of this invention before insertion of the tube end into the body assembly;

FIG. 2 is a side elevation similar to FIG. 1 but illustrating the tube end and body assembly in the fully assembled position;

FIG. 3 is an exploded perspective view of the components of the tube end prior to assembly;

FIG. 4 is a perspective view similar to FIG. 3 but illustrating the parts after the tube end is assembled but before crimping;

DETAILED DESCRIPTION OF THE DRAWINGS

Figure 5:
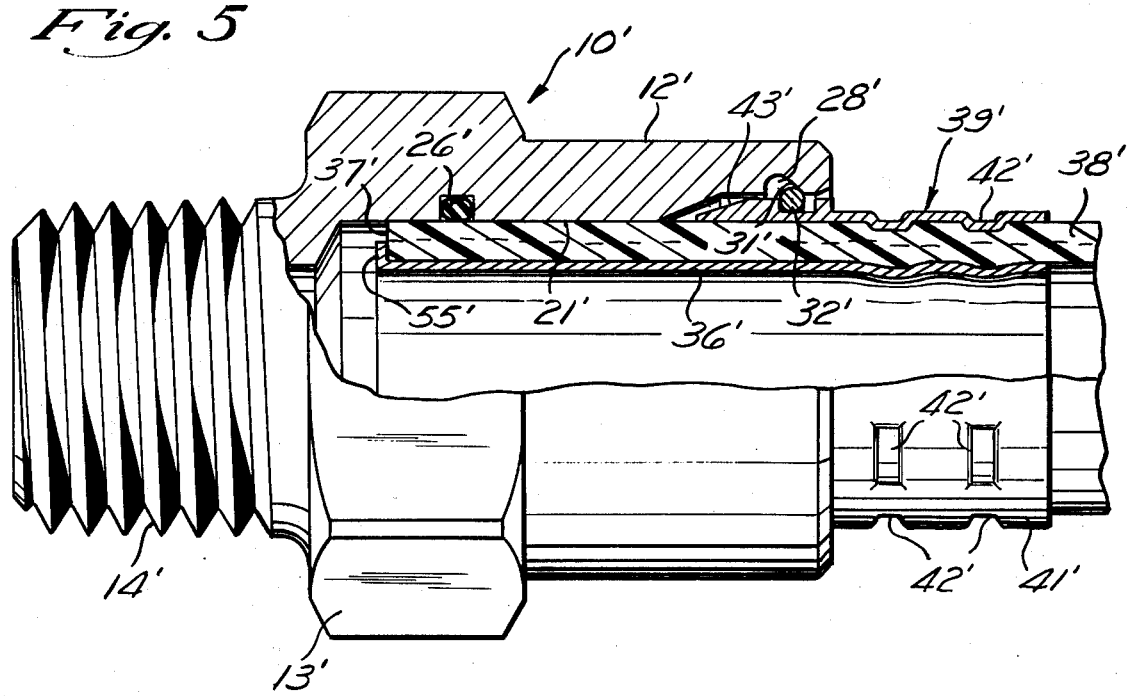
FIG. 5 is a side elevation partially in longitudinal section illustrating a second embodiment of this invention in which the body assembly includes a single body part; and, FIG. 6 is an enlarged view of the lock ring in accordance with the preferred embodiment of this invention.

Referring to FIGS. 1 through 4 one preferred embodiment of this invention includes a body assembly 10 and a tube end assembly 11 which are illustrated in FIG. 1 prior to the insertion of the tube end assembly 11 into the body assembly 10. The body assembly includes a tubular body 12 formed with a central wrenching section 13 and a threaded forward end 14 which is adapted to be threaded into any suitable device for mounting the body assembly to the connected system. It should be understood that although the body 12 is illustrated as providing a threaded end connection at 14 other types of end connections may be utilized or the body structure may be formed in the associated device, and such variations are within the scope of the present invention. The rearward end of the body 12 is also externally threaded at 16 to receive a nut 17.

Normally, the nut 17 is threaded onto the body 12 prior to the installation of the body assembly on the associated equipment and is properly torqued. The nut is provided with a forward end face 18 which seats against a wall 19 on the body 12 when the nut is properly positioned with respect to the nut and is properly torqued.

The body 12 in cooperation with the nut 17 provides a through passage including a forward tube receiving portion 21 and a rearward sleeve receiving portion 22. Beyond the forward tube receiving portion 21 is a bore 23 which preferably has a diameter at least substantially equal to the inside diameter of the tube to be connected to the body assembly 10.

The body 12 is provided with an inner annular seal groove 24 intermediate the ends of the tube receiving portion 21 with an O-ring 26 positioned therein. The rearward end of the tube receiving portion 21 is provided with a conical flaring section 27.

Figure 6:
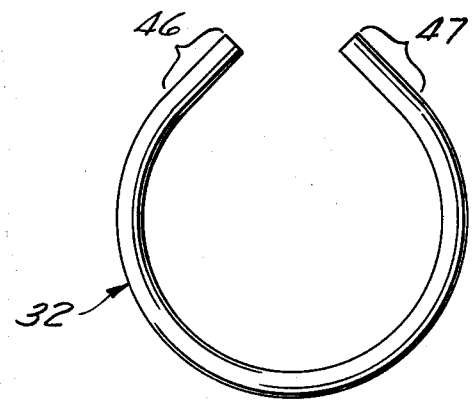

The nut 17 is provided with an interior annular groove 28 spaced from the tube receiving portion 21. Such groove is preferably formed with a substantially radial forward face 29 and an inclined rearward face 31 which function as discussed below. Positioned within the interior groove 28 of the nut 17 is an expandable lock ring 32 shaped as illustrated in FIG. 6. The nut is provided with wrenching flats 33 so that the nut may be threaded onto and off of the body 12.

The tube end assembly 11 includes a tubular insert 36 which extends inwardly from the forward ends 37 of a tube 38. In the illustrated embodiments the tube 38 is a reinforced plastic tube formed of nylon or the like. It should be understood however, that in its broader aspects the present invention can be applied to other types of tube which are elastomeric or metallic. Mounted on the exterior of the tube 38 is a metallic locking sleeve 39 providing a rearward skirt portion 41 which is crimped inwardly at 42 to grip the wall of the tube 38 between the locking sleeve 39 and the inner end of the insert 36. The particular pattern of crimping illustrated includes two axially spaced crimped sections each including a plurality of peripherally spaced individual crimped projections. Such crimping pattern tends to produce slight deformation of the insert 36 beneath the crimp projections as illustrated. Such crimping pattern firmly locks the locking sleeve 39 on the tube 38 against relative movement therebetween and since the crimps are spaced from the two ends of the sleeve, the sleeve provides support for the tube on either side of the crimped zone. Forward of the skirt 41 the locking sleeve 39 is formed with a conical camming ramp 43 and a peripheral groove 44.

When the tube end 11 is pushed into the body assembly 10 to the assembled position illustrated in FIG. 2 the forward end of the tube 38 extends into the tube receiving portion 21 of the body with a close fit and extends past the seal 26. The various proportions are arranged so that the seal 26 has an unstressed inside diameter less than the outside diameter of the tube 38 so that the movement of the tube to the assembled position of FIG. 2 causes radial compression of the seal as illustrated in FIG. 2. In such condition the seal provides a fluid tight joint between the exterior surface of the tube 38 and the body 12.

During such assembly the camming ramp 43 engages the lock ring 32 and radially expands the lock ring 32 from its unstressed condition out into the interior groove 28. During such movement the lock ring 32 is urged forward by the camming ramp 43 and engages the radial wall 29. Because the wall 29 is radial the lock ring 32 can expand easily as the camming surface is moved into the assembled position.

As the tube end 11 is moved into the fully assembled position the peripheral groove 44 moves to a position within the lock ring 32 so that the lock ring is allowed to snap back into a position in which it bridges between the two annular grooves 28 and 44. In such bridging position the sleeve 39 is permanently mechanically locked in position within the nut 17.

The lock ring 32 is formed with an unstressed radius sized so that its outer periphery has a radius greater than the radius of the inner extremities of the tube walls 29 and 31 of the groove 28 and its inner periphery has a radius less than the radius of the lock sleeve 39 on the two opposite sides of the peripheral groove 44. Consequently, the ring 32 is trapped within the groove 28 of the nut prior to assembly but snaps into the peripheral groove 44 upon assembly of the tube end within the body assembly.

The rearward inclined wall 31 insures that the lock ring 32 is cammed inwardly into the peripheral groove 44 when the tube end 11 is subjected to forces tending to pull the tube end out of the body assembly. Such axial force on the tube end occurs from pressure within the coupling but merely causes the lock ring to be cammed in along the inclined wall 31 to a position as illustrated in FIG. 2 in which the interior of the lock ring bottoms out on the inner walls provided by the groove 44. In order to insure this locking action the radius of inner wall of the peripheral groove 44 is selected to be less than the radius of the inner extremities of the inclined wall 31 by an amount less than the diameter of the wire forming the lock ring. With such structure a positive mechanical locking of the locking sleeve 39 within the lock nut is provided.

Preferably the lock ring 32 is formed with a uniform radius throughout the major portion of its length, as illustrated in FIG. 6, and is provided with straight end portions 46 and 47. Such end portions tend to maintain the lock ring in proper position within the interior groove 28 to receive the end of the locking sleeve 39 even though the interior groove 28 has a diameter substantially larger than the principal diameter of the lock ring. In order to allow the lock ring to expand as the locking sleeve 39 is pressed into the assembled position the depth of the interior groove 28 is proportioned to be at least as great as the diameter of the wire forming the lock ring 32.

FIGS. 3 and 4 illustrate the insert 36, the tube 38 and the lock sleeve prior to assembly and after properly assembled but before crimping. Preferably the locking sleeve 39 is formed with an interior bore 51 having a diameter slightly larger than the maximum diameter of the tube 38 within the tolerance range of tube sizes so that the locking sleeve 39 can be easily slipped over the end of the tube 38. However, in the illustrated embodiment the skirt portion 41 is provided with peripherally spaced dimples 52 which causes protrusions to extend into the bore 51 so that the lock sleeve frictionally engages the wall of the tube 38 beneath the protrusions to prevent the lock sleeve 39 from loosely sliding along the tube. The protrusions therefore hold the lock sleeve in its proper position along the lengths of the tube 38 prior to crimping. The axial location of the dimples 52 is preferably selected to be in the plane of the forward band of crimp projections 42 to provide a visual indication for the proper location of the crimping tool when hand crimping is utilized.

As best illustrated in FIG. 3 the insert 36 is flared at its end at 53 to a maximum diameter greater than the maximum diameter within the tolerance range of the interior of the tube. The remaining portions of the insert 36 are preferably sized to have a diameter slightly less than the inside diameter of the tube within the minimum tolerance range thereof. The flared section 53 is formed with a plurality of axial cuts 54 which provide the flared section with resiliency so that as it is pressed into the tube the flared section frictionally engages the interior of the tubing 38 and is deflected inwardly. This provides engagement at the end of the tube to prevent the insert from sliding in along the tube beyond the proper position in which its end is flush with the end 37 of the tubing.

Preferably the tube ends assembly is crimped in a fixture arranged so that the proper positioning of the insert and the locking sleeve with respect to the end of the tube 38 is automatically achieved. With such fixture the insert is pressed lightly or partially into the end of the tube and the locking sleeve 39 is positioned on the end of the tube closer to the ends than the required final position. The assembly is then pressed into the fixture which engages the end of the insert causing it to be pushed into the tube until it is flush with the end as illustrated. At the same time the fixture causes the locking sleeve 39 to slide back along the tube to its proper position. The frictional engagement of the dimple resists such movement and insures that the lock ring does not slide beyond its proper position. The crimping tooling is then operated to produce the crimp.

In the embodiment of FIGS. 1 and 2 the body assembly 10 is installed in the associated equipment with the nut 17 properly torqued into position. Complete assembly is accomplished thereafter by merely pressing the tube end 11 into the body assembly to its assembled position in which it is permanently locked within the nut 17. The locking sleeve is preferably provided with a wall 56 which is at least aligned with the end of the nut when the tube end is in the assembled position. Such structure provides a visual indication that the tube end has been pushed into the body assembly a sufficient amount to cause the seal to engage the end of the tubing and the lock ring to lock the parts together.

With such embodiment it is possible to remove the tube end 11 from the body 12 by threading the nut 17 off of the body and to reinstall the tube end by threading the nut back onto the body. So the embodiment of FIGS. 1 and 2 can be assembled and disassembled without removal of the body 12 from the associated equipment. However, during the first assembly, the tube end 11 is installed by merely pressing it into the body assembly. The flared wall 27 performs a dual function of providing clearance for the forward end of the locking sleeve and also for guiding the end of the tubes into the tube receiving portion 21 of the body 12.

FIG. 5 illustrates a second embodiment of this invention in which a unitary body is provided. In this embodiment similar reference numerals are used to indicate similar parts with a prime (') added to indicate that reference is being made to the second embodiment. The body assembly 10' includes a unitary body member 12' and does not include a nut. The body member 12' is formed with a tube receiving portion 21' proportioned to closely fit the end of the tube 38'. Here, again, a seal 26' is positioned to engage the outer surface of the tube 38' to provide the fluid tight joint. In this embodiment, however, the interior groove 28' for the lock ring 32' is formed at the rearward end of the body member rather than in a nut.

The sleeve 39' has the same structure as the sleeve of the first embodiment, however, the insert 36' is not enlarged with a conical flared end but instead is enlarged with a flange 55' which engages the end face of the tube 38' when it is properly positioned with respect to the end of the tube. Such flange does not permit appreciable elongation of the tube ends during the crimping operation and is normally used only with tubing which is formed of a material or of a wall thickness which does not produce appreciable elongation of the tube when the crimping 42' is performed to lock the sleeve 39' on the tube 38'.

If the tube has a tendency to elongate as a result of the crimping operation and if a flange 55' prevents such elongation there is a tendency for the diameter of the tube to increase or swell and for difficulty to occur when the enlarged end of the tube is pressed against the seal 26'. In such instances the structure of the first embodiment is preferred for frictionally engaging the end of the tube to maintain proper location of the insert since such structure does not prevent lengthening of the tube end resulting from the crimping operation.

The embodiment of FIG. 5 in which a separate nut is not utilized may be used where it is not necessary to allow removal of the tube end without removal of the main body member. On the other hand, where the ability to disassemble the coupling without removal of the body is required, the embodiment of FIGS. 1 and 2 is used since such embodiment permits such action.

It should be noted that there is freedom for relative rotation between the tube end assemblies and the body assemblies of both embodiments. Such relative rotation permits the nut of the first embodiment or the entire body assembly of the second embodiment to be rotated for disassembly of the coupling without corresponding rotation of the tube. Similarly, the tube may be rotated relative to the body assembly when required for installation in confined locations.

Generally this invention is applied to pressure lines and both illustrated embodiments are for such use. However, in accordance with the broader aspects of this invention it is useful for other purposes. For example, it is also applicable for use in electrical connectors and conduit systems.

Although preferred embodiments of this invention are illustrated it is to be understood that various modifications and rearrangements may be resorted to without departing from the scope of the invention disclosed and claimed.

I claim:

1. A quick connect tube coupling comprising a tubular body assembly, a flexible tube formed of plastic or elastomeric material having interior and exterior cylindrical surfaces and an end portion terminating at an end face, a metallic tubular insert extending into said tube from said end face and supporting said interior surface of said tube, a tubular sleeve around said exterior surface of said tube spaced axially from said end face, said exterior surface of said tube being a substantially smooth continuous uninterrupted surface extending axially rearwardly from said end face beyond said tubular sleeve, said tubular sleeve including gripping surface means extending radially inwardly into said exterior surface of said tube, said gripping surface means cooperating with said insert to grip said tube and lock said sleeve against movement relative to said tube, said sleeve being formed with a forward camming surface and a peripheral groove, said peripheral groove being disposed between said camming surface and said gripping surface means, said body assembly providing a forward portion proportioned to closely fit said end portion of said tube between said end face and said sleeve and a rearward portion proportioned to receive said camming surface and peripheral groove, a resilient seal operable to engage and seal with said exterior surface of said tube, said rearward portion being provided with an interior annular groove, an expandable lock ring loosely positioned in said interior groove, said camming surface being disposed between said lock ring and said forward portion and expanding said lock ring into said interior groove as said tube is inserted into said body assembly until said peripheral groove is within said lock ring and said tube engages and is sealed by said seal, said lock ring bridging between said peripheral grooves and said interior groove and preventing relative axial movement between said tube and said body assembly.

2. A quick connect coupling as set forth in claim 1 wherein said sleeve is formed with a skirt on the side of said peripheral groove remote from said camming surface, and said gripping surface means includes a plurality of axially spaced surfaces on said skirt which are crimped inwardly toward said insert to grip the wall of said tube and lock said sleeve with respect to said tube.

3. A quick connect coupling as set forth in claim 2 wherein said insert is provided with an enlarged portion at one end engaging said tube at its end to resist movement of said insert into said tube beyond the end thereof.

4. A quick connect coupling as set forth in claim 1, wherein said body assembly includes a body member and a nut removably threaded onto said body member, said forward portion and said seal are disposed on said body portion, and said interior annular groove and lock ring are disposed on said nut.

5. A quick connect coupling as set forth in claim 4, wherein said body member includes camming surface means between said forward portion and said interior groove for guiding said end of said tube into said forward portion during assembly, and said forward camming surface of said tubular sleeve is disposed between said camming surface means and said lock ring.

6. A quick connect coupling as set forth in claim 2, wherein said insert includes a nominal diameter portion and inwardly deflected surfaces disposed radially inwardly from said nominal diameter portion adjacent each of said spaced surfaces, and said tubular sleeve further includes temporary holding surfaces extending radially inwardly into said exterior surface of said tube adjacent said nominal diameter portion of said insert.

7. A quick connect tube coupling comprising a tubular body assembly, a flexible tube formed of plastic or elastomeric material having interior and exterior cylindrical surfaces and an end portion terminating at an end face, a metallic tubular insert extending into said tube from said end face and supporting said interior surface of said tube, a tubular sleeve around said exterior surface of said tube spaced axially rearwardly from said end face, said exterior surface of said tube being a substantially smooth continuous uninterrupted surface extending axially rearwardly from said end face beyond said tubular sleeve, said tubular sleeve including gripping surface means extending radially inwardly into said exterior surface of said tube, said gripping surface means cooperating with said insert to grip said tube and lock said sleeve against movement relative to said tube, said sleeve including a rearward skirt portion and a forward camming surface and a peripheral groove, said peripheral groove being disposed between said forward camming surface and said rearward skirt portion, said gripping surface means being disposed on said skirt portion, said body assembly providing a forward portion proportioned to closely fit said end portion of said tube between said end face and said sleeve and a rearward portion proportioned to receive said camming surface and peripheral groove, an annular seal groove in said forward portion, a resilient seal in said annular seal groove operable to engage and seal with said exterior surface of said tube between said end face and said sleeve, said rearward portion being provided with an interior annular groove, an expandable lock ring loosely positioned in said interior groove, said camming surface being disposed between said lock ring and said forward portion and expanding said lock ring into said interior groove as said tube is inserted into said body assembly until said peripheral groove is within said lock ring and said tube engages and is sealed by said seal, said lock ring bridging between said peripheral groove and said interior groove and preventing relative axial movement between said tube and said body assembly, and said skirt portion being disposed outside of said body assembly axially rearwardly of said interior groove.

8. A quick connect tube coupling comprising a tubular body assembly having a body member and a nut removably threaded onto said body member, a flexible tube formed of plastic or elastomeric material having interior and exterior cylindrical surfaces and an end portion terminating at an end face, a metallic tubular insert extending into said tube from said end face and supporting said interior surface of said tube, a tubular sleeve around said exterior surface of said tube spaced axially from said end face, said exterior surface of said tube being a substantially smooth continuous uninterrupted surface extending axially rearwardly from said end face beyond said tubular sleeve, said tubular sleeve including gripping surface means extending radially inwardly into said exterior surface of said tube, said gripping surface means cooperating with said insert to grip the wall of said tube and lock said sleeve against movement relative to said tube, said sleeve including a rearward skirt portion and a forward camming surface and a peripheral groove, said peripheral groove being disposed between said forward camming surface and said rearward skirt portion, said gripping surface means being disposed on said rearward skirt portion, said body assembly providing a forward portion proportioned to closely fit said end portion of said tube between said end face and said sleeve and a rearward portion proportioned to receive said camming surface and peripheral groove, an annular seal groove in said forward portion, a resilient seal in annular seal groove operable to engage and seal with said exterior surface of said tube between said end and said sleeve, said rearward portion being provided with an interior annular groove, an expandable lock ring loosely positioned in said interior groove, said camming surface being disposed between said lock ring and said forward portion and expanding said lock ring into said interior groove as said tube is inserted into said body assembly until said peripheral groove is within said lock ring and said tube engages and is sealed by said seal, said lock ring bridging between said peripheral groove and said interior groove and preventing relative axial movement between said tube and said body assembly, said forward portion and said seal being disposed on said body portion of said body assembly, said interior annular groove and lock ring being disposed on said nut of said body assembly, and said skirt portion being disposed outside of said body assembly axially rearwardly of said interior groove.

* * * * *